UNITED STATES PATENT OFFICE.

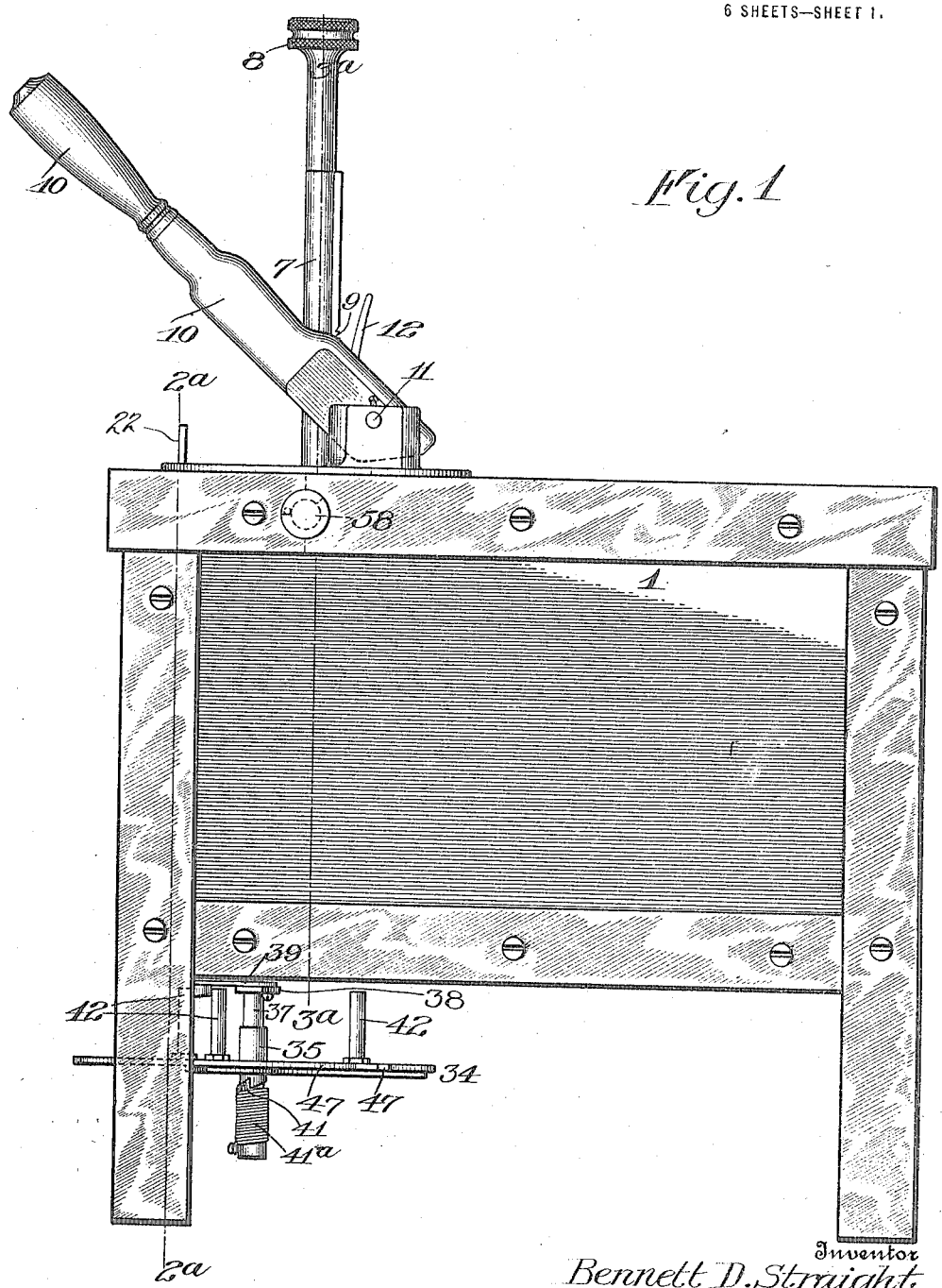

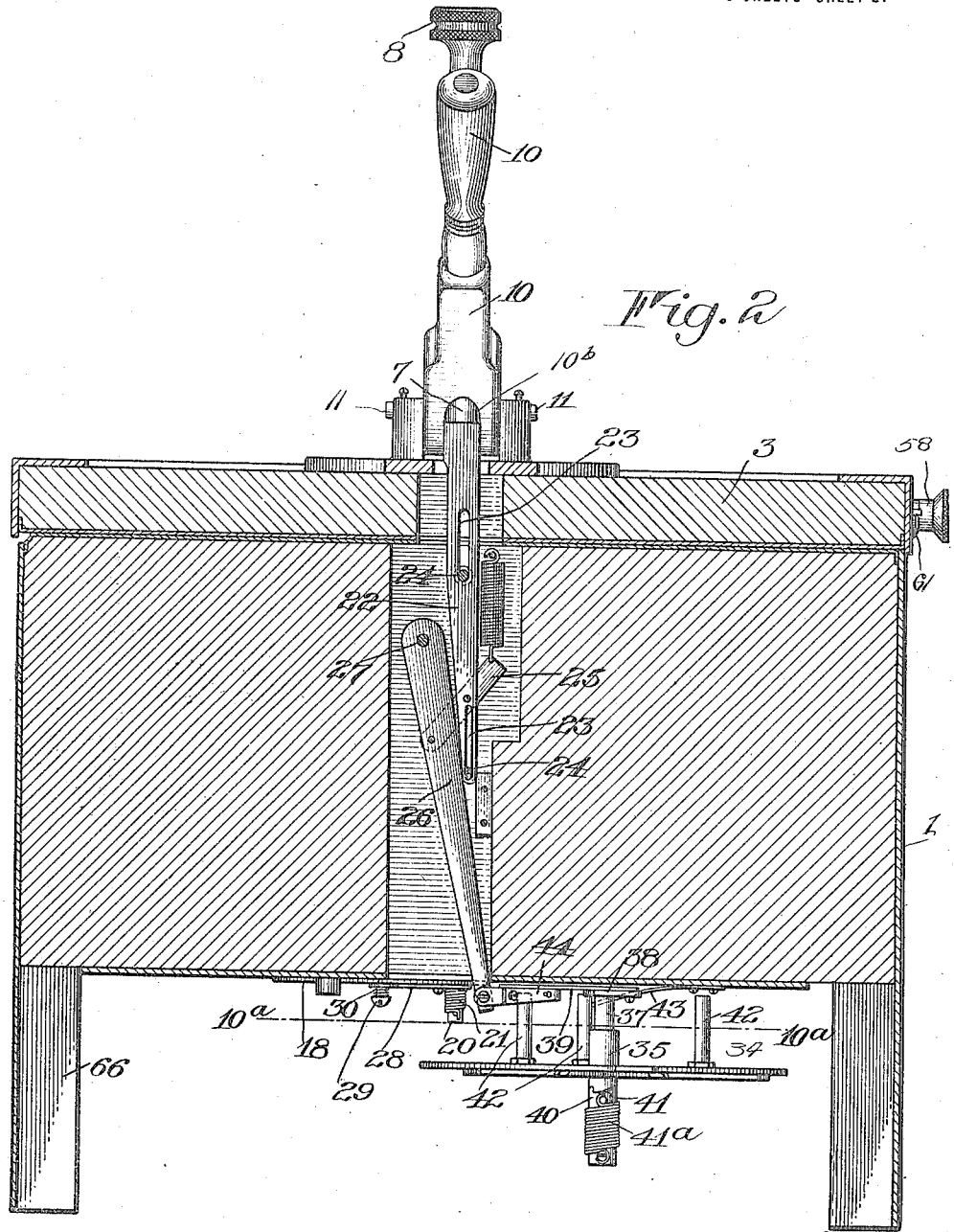

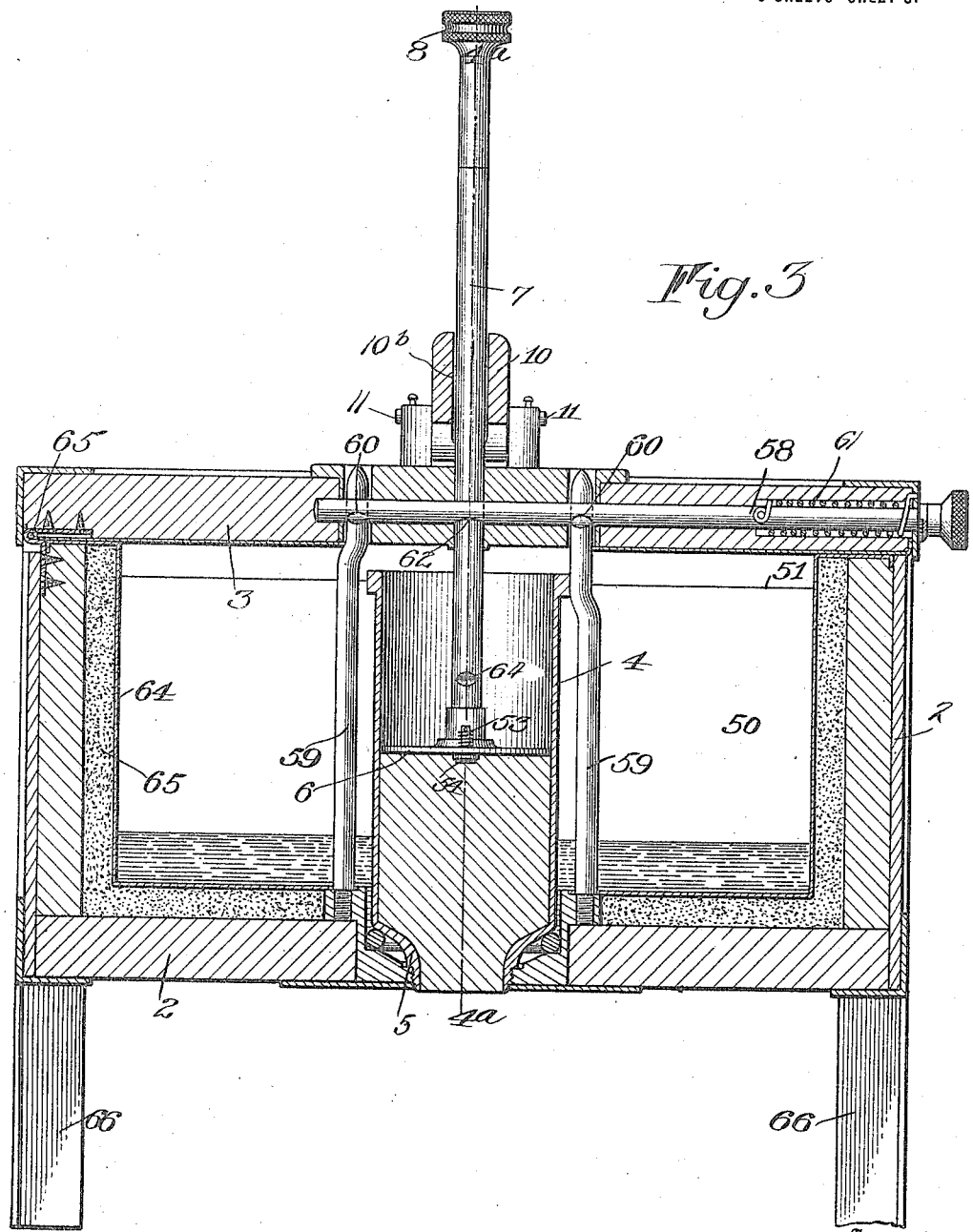

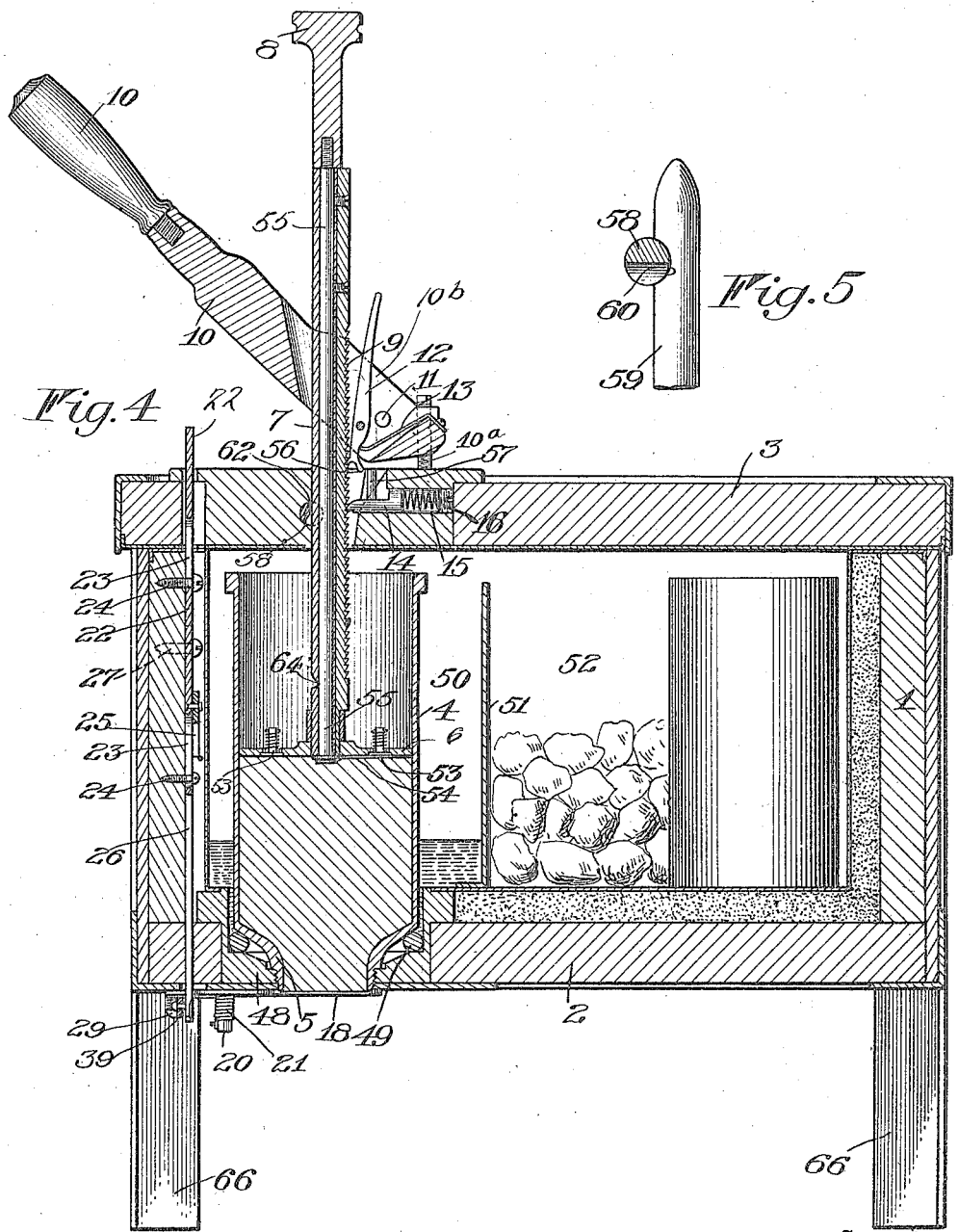

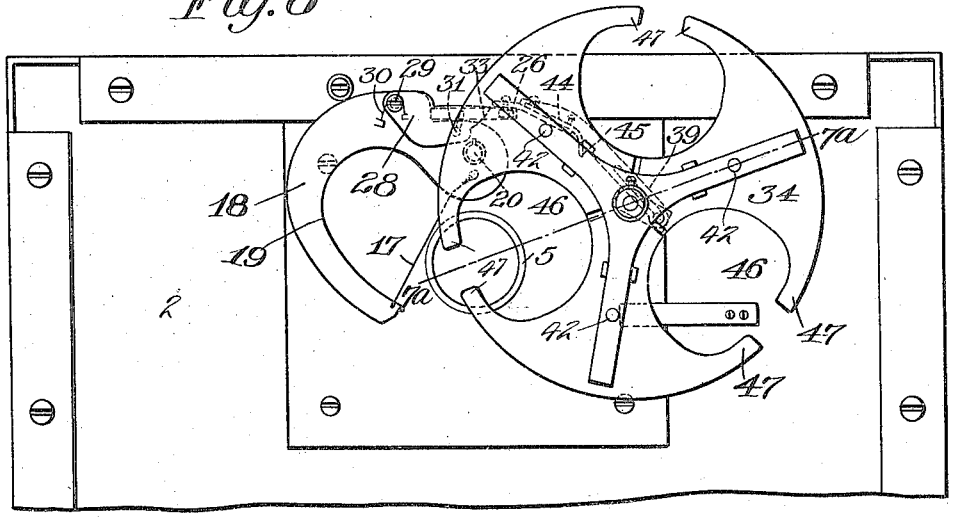
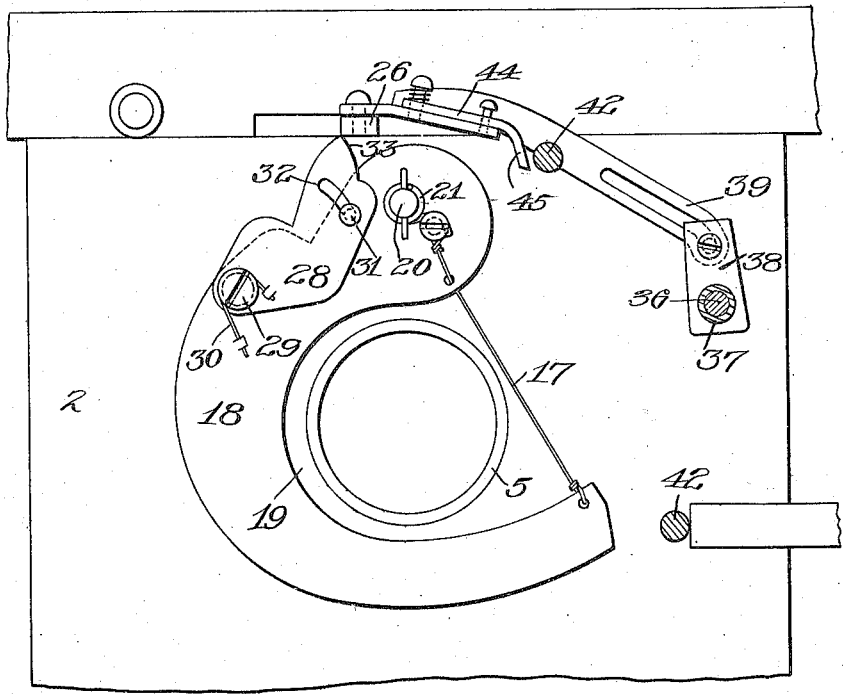

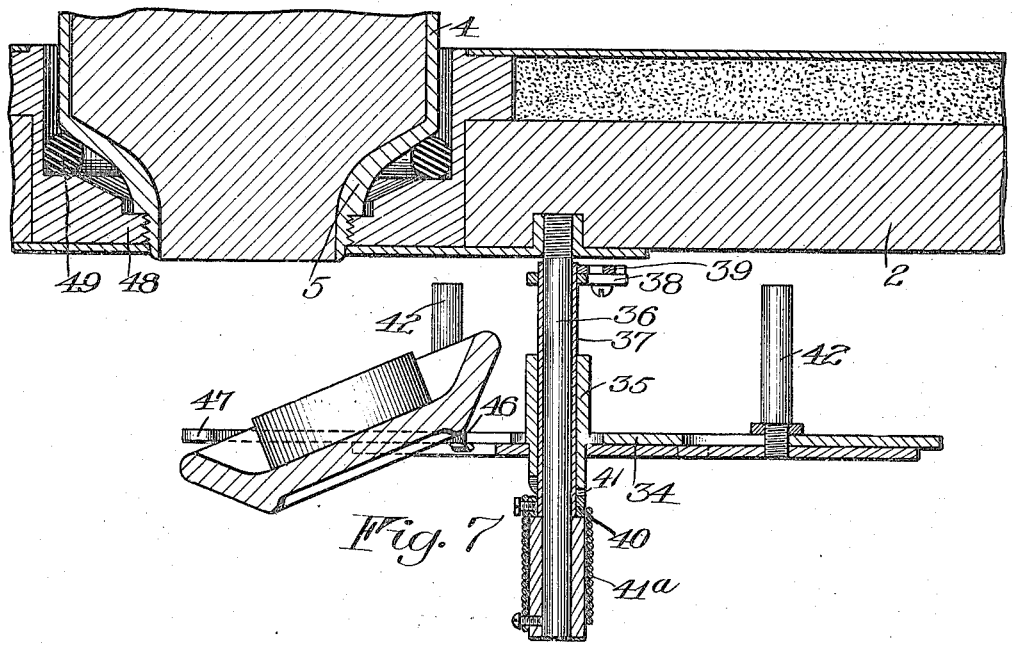
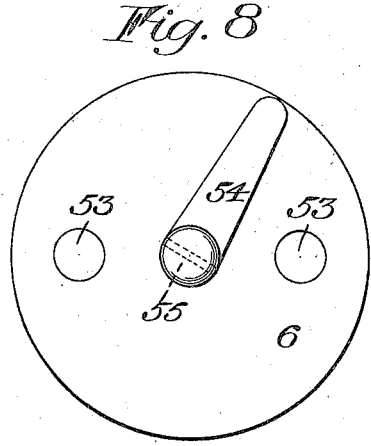
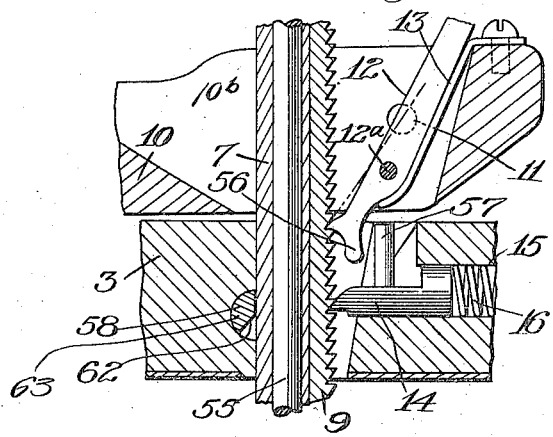

BENNETT D. STRAIGHT, OF ROCHESTER, NEW YORK, ASSIGNOR, BY MESNE ASSIGNMENTS, TO BUTTER SERVING MACHINE COMPANY, INC., OF ROCHESTER, NEW YORK, A CORPORATION OF NEW YORK.

DISPENSING APPARATUS.

1,263,815.   Specification of Letters Patent.   Patented Apr. 23, 1918.

Application filed March 13, 1915.   Serial No. 14,117.

*To all whom it may concern:*

Be it known that I, BENNETT D. STRAIGHT, of Rochester, in the county of Monroe and State of New York, have invented certain new and useful Improvements in Dispensing Apparatus; and I do hereby declare the following to be a full, clear, and exact description of the same, reference being had to the accompanying drawings, forming a part of this specification, and to the reference-numerals marked thereon.

My invention has for its object to provide a dispensing machine adapted to be used particularly for forming butter patties such as are served in restaurants, hotel dining rooms and other places where a great number of individual portions of butter are needed. The invention has for its further object to provide a mechanism adapted to receive a quantity of the material to be served, retain it at the proper serving temperature and deliver as required equal portions of a predetermined size which may be received successively on plates automatically positioned. To these and other ends the invention consists in certain improvements and combinations of parts, all as will be hereinafter more fully described, the novel features being pointed out in the claims at the end of the specification.

In the drawings:

Figure 1 is a side elevation of a machine illustrating one embodiment of the invention;

Fig. 2 is a vertical sectional view taken on the line 2ª—2ª of Fig. 1;

Fig. 3 is a transverse sectional view taken vertically on the line 3ª—3ª of Fig. 1;

Fig. 4 is a sectional view on the line 4ª—4ª of Fig. 3;

Fig. 5 is a detail view of the locking mechanism;

Fig. 6 is a bottom plan view;

Fig. 7 is a sectional view on the line 7ª—7ª of Fig. 6;

Fig. 8 is a detail view of the ejector showing a bottom plan arrangement of the same;

Fig. 9 is an enlarged view of the parts with the main lever depressed, and

Fig. 10 is an enlarged sectional view on the line 10ª—10ª of Fig. 2.

Similar reference numerals in the several figures indicate the same parts.

In the machine illustrated one embodiment of the invention is shown comprising a casing having side walls 1, a bottom 2 and a hinged closure or top 3. Arranged within the casing is a container 4 which is vertically disposed and open at the top and bottom, the bottom being provided with a tapered neck 5 forming a restricted, or reduced discharge opening through which the material is ejected. Moving vertically within the container 4 is an ejector, which in the present instance embodies a plunger or piston 6 mounted on the tubular rod 7, having a knurled head 8 at its upper end. The rod 7 is provided with a rack bar 9 by means of which intermittent advancing movement is imparted to the ejector. The rack bar is preferably detachable from the rod 7 to permit bars having teeth of different lengths to be employed thus forming a convenient means by which the sizes of the portions ejected may be varied. The ejector is controlled by an actuating means coöperating with said rack bar to compress the contents of the container and cause a portion thereof to protrude from the nozzle or discharge opening.

Pivotally mounted on the closure 3 is an operating lever 10 pivoted at 11 and carrying a pivotally mounted pawl 12, which engages the teeth of rack 9 and is held in operative relation therewith by means of the spring 13. The lever pivotal connection comprises two alined pins 11, spaced apart at their inner ends to give room between them for operation of the pawl 12 within the lever slot 10ᵇ, in which the piston rack rod 7 freely moves vertically. It will be seen that a certain predetermined movement will be imparted to the ejector at each downward movement of the lever 10, the initial position of the lever and pawl being determined by the set screw or stop 10ª shown in Fig. 4. The parts are so arranged that each operation of the lever 10 will cause a sufficient downward movement of the ejector to discharge a given predetermined quantity of the material in the container which, when the material operated on is butter, will be the amount required to form a patty suitable for individual service. Coöperating with the rack bar is a detent 14 arranged in a recess 15 and projected by a spring 16.

The tendency to expand after compression is inherent in most plastic substances, and particularly butter, because of the air therein, and in order to check the continued movement of the mass after the portion expressed has reached the required dimensions it is necessary to relieve the pressure of the ejector. To take care of this condition the structure is so designed that the ejector after moving downwardly the required distance is released and is free to move upwardly slightly. This is accomplished by giving the pawl 12 an advancing movement slightly in excess of the length of the rack teeth over which the pawl is retracted. In the present arrangement of the parts the pawl 12 traverses one tooth and when the ejector is moved downwardly it is advanced the distance of one and a fraction teeth and on each stroke of the lever 10 carries a tooth of the rack 7 beyond the detent 14. Consequently when the pressure of the lever is relieved the ejector is free to move upwardly a short distance. Removal of the pressure above the mass instantly arrests the tendency of the plastic material to exude from the nozzle.

Arranged for movement transversely of the discharge opening of the container 4 is a cutting member, preferably disposed adjacent thereto, and in the present instance consisting of a wire 17 having its ends secured to a frame 18 and extending across the opening 19 therein of such size that the wire can sweep entirely over the discharge opening and permit the severed portion of material to fall through the opening 19. The frame 18 is pivotally mounted on a post or bearing 20 and is held in normal position, as shown in Fig. 6, by means of a spring 21, which returns it to its initial position after it is operated by its actuating member. It is desirable that the cutting member be moved, subsequently to each operation of the ejector, and this is accomplished by devices controlled by the ejector actuating means which are set in operation toward the limit of the downward stroke of the main lever 10. The latter, during its downward movement, engages a slide 22, having guide slots 23 and coöperating with guide pins 24. A link 25 is pivotally connected to the slide 22 and also to the lever or actuator 26, which is pivoted at 27 and extends downwardly to a point beneath the casing, so that its lower end is in position to engage a portion of the cutter frame 18 when the parts are operated. In order to accomplish the desired movement of the frame, the latter carries a latch 28 which is pivoted at 29 and controlled by a spring 30, its movement being limited as shown in Fig. 10 by engagement of a pin 31 on the frame 18 with one end of the latch slot 32. The latch 28 has a cam surface 33 shown in Figs. 6 and 10 and lying in the path of the actuator 26 and engaged thereby when it is moved laterally, as a result of the movement of slide 22. The frame 18 is thus rotated on its axis until the actuator rides off of the latch 28, whereupon it is returned by the spring 21. The latch 28 swinging on its axis 20 is returned to its initial position by the spring 30 after the actuator 26 passes out of engagement with the latch in returning to its initial position shown in Fig. 2.

The butter patty, when discharged, is received on a plate supported on a carrier which is automatically moved at each operation to bring an empty butter plate into receiving position. The plate carrier is designated generally as 34 and embodies a collar 35 arranged loosely on the fixed post 36 and surrounding the sleeve 37, as shown in Figs. 1, 2 and 7. The sleeve has fixed thereon an arm 38 which is connected by means of a link 39 with the actuator 26 before described. This sleeve 37 carries at its lower end a collar 40 provided with a plurality of ratchet teeth 41 which engage coöperating recesses formed on the collar 35 of the plate carrier. From this arrangement of parts it will be seen that when the actuator 26 is rocked it causes an oscillation of the sleeve 37 and through the teeth 41 effects a corresponding advance movement of the plate carrier. Upon the return movement of the actuator, the sleeve 37, is rotated to its initial position by means of the spring 41ᵃ. The plate carrier is provided with a plurality of stops 42 arranged to engage coöperating devices in order to prevent reverse movement of the carrier and also to limit its advance movement at each operation. The stops successively engage a yielding or spring member 43, shown in Fig. 2, which is arranged so as to permit the stops to pass it during the forward operation of the plate carrier and to lock the latter against any retrograde movement. Excessive forward movement of the plate carrier is prevented by a stop pawl 44 shown in Figs. 2 and 10 having a nose 45 which engages the corresponding stop 42 to prevent the plate carrier from overthrowing and is moved out of the path of the stop pin upon the following operation of the actuator 26 to permit the necessary partial rotation of the carrier to bring another plate into position. The parts are so timed that at the limit of the operative movement of the actuator the stop pawl 44 is moved just far enough to permit the adjacent stop 42 on the plate carrier to be released, and is returned far enough to engage the next stop on the carrier before the latter is permitted any further movement.

It has been found that when a section of material, such as butter, is cut on a horizontal plane and permitted to drop, it usually falls at an angle to the horizontal and unless the receiving plate is positioned at such an angle it will not properly receive the patty. Furthermore, in a machine such as that described in the present apparatus, where the cutting member forcibly delivers the body of discharged material in a direction away from the remaining mass, the patty in falling is directed more or less to one side. In order, therefore, to properly receive the discharged portion, the carrier is constructed and arranged to support the receiving plate at one side of the discharge opening, rather than directly beneath it, and at an angle to the horizontal. To this end, the plate carrier embraces a plurality of irreglarly shaped plate receiving openings 46 which are wider at their outer portions, and defined, each by a pair of arms 47, which serve to support a plate in the manner shown in Fig. 7, with its inner edge in an elevated position.

In operating the machine, the plate carrier usually contains two empty plates, the plate receiving opening toward the operator being empty, in position to receive a plate. The lever 10 being depressed, moves the ejector downwardly far enough to discharge the desired quantity of butter from the container 4. During the latter part of the downward movement of the lever 10, the slide 22 being engaged is depressed, and through the lever 25, actuator 26, latch 28, and frame 18 the cutting member 17 is moved transversely of the discharge opening and severs the patty. The cutting member is then released and returns quickly to its initial position and, if the patty has not fallen into the plate, which was previously positioned to receive it, the return movement of the cutter knocks it off the discharge nozzle 5; the plate carrier 34 then rotates one step and brings the filled plate into position to be removed by the operator and at the same time positions another empty plate under the discharge opening.

Where the machine is used for dispensing butter or similar material subject to temperature changes great care must be exercised both in the construction of the container and the manner in which it is located in the refrigerating chamber in order that the discharge end or nozzle may always retain the proper temperature. The arrangement of these parts should be such that the discharge nozzle 5 is only slightly warmer than the body of the container 4 thus preventing the mass of the butter as it passes therethrough from being reduced in temperature and caused to adhere to the walls of the nozzle. Under such conditions a crater of butter is formed within the nozzle and an imperfect and irregular shaped patty is formed by the portion of butter at the center of the nozzle which is more plastic by reason of the fact that the butter in contact with a nozzle chilled below a given temperature will absorb cold and adhere or "freeze" to the walls of the nozzle. On the other hand, if the temperature of the nozzle becomes warm the butter will become soft and unsuitable to serve and therefore the area of the discharge opening should be maintained at such a temperature as to restrain the outflow of butter that would otherwise take place. In order to maintain the container and its nozzle and the substance operated on all at a proper temperature and in what I consider a simple manner, I place the container 4 in a compartment 50 of the casing and position its lower end in a cavity in the casting 48 forming part of the bottom of the casing. The extremity or restricted end of the container forming the nozzle 5 is preferably threaded into the casting 48, against a gasket 49 which prevents leakage of any water. The other compartment or chamber 52 is used for the storage of ice and molded cylinders of butter which may be inserted in the container as the latter is emptied.

The container 4 is not chilled directly by surrounding it with a cooling medium such as cracked ice but is maintained at the desired temperature by placing water in the chamber 50 which being in contact with the wall 51 remains cool from the melting of the ice in the chamber 52.

In order to permit the more ready removal of the ejector or plunger 6 from the butter container and to obviate the formation of a partial vacuum beneath the ejector, the latter carries one or more spring controlled inwardly opening valves 53. The ejector is also provided with a stripping member or scraper 54 mounted on a spindle 55 extending upwardly through the rod 7 and operated by the knurled head 8. When the container 4 is nearly empty, the spindle 55 is rotated to separate the butter from the lower face of the plunger, and the latter is then raised by first moving the pawls 12 and 14 out of engagement with the teeth of the rack bar 9. This is accomplished by moving the upper end of the pawl 12 toward the rod 7, at which time its tail piece 56 engages a projection 57 on the pawl 14, to retract the latter. It might also be mentioned that the pivot 12$^a$ of the pawl 12 on the lever 10 is so positioned in relation to the pivot of said lever that when the lever 10 reaches the point where it engages the actuating member 22, movement of the ejector ceases and no pressure is applied to the material acted upon while the cutter is operating because at this point in the movement of the parts the pivot 12$^a$ of the pawl 12 passes the pivotal center 11 of the lever 10 and thereafter not only does the advance of the ejector cease, but its retrograde movement is permitted. From this arrangement of the parts it will be understood that the lever 10 during a portion of its oscillatory movement causes the ejector to advance a predetermined distance, after which the lever continues onward to the limit of its movement, and during such free movement independent of the ejector said lever engages and operates the member 22 which actuates the cutter.

The casing closure 3 is normally locked, as shown in Figs. 3, 5 and 9, by a rotary spindle 58, which is revolubly fitted in or on the closure 3, and passes through rounded recesses 60 in two posts 59 secured in the casing. Both the spindle and posts are provided with corresponding recesses 60, so that when the spindle is turned counterclockwise manually to a predetermined position, it is disengaged from the posts 59, thus permitting the closure 3 to be elevated or opened, as hereinafter more fully explained. The locking spindle 58 is preferably turned clockwise automatically by a coil spring 61 arranged mainly within the closure 3. The ejector operating devices are so arranged that the ejector must be in a predetermined position of adjustment to permit the closure to be released. The means illustrated for accomplishing this object consists in the present instance in providing the locking member 58, with a cut-out, or recess, 62 preferably extending circumferentially for about two hundred and twenty-five degrees and receiving within it the ejector rod 7 from which the lower radial wall of the recess stands off at an angle of about forty-five degrees, as shown in Fig. 9, thereby providing on the locking member 58 a lower shoulder or detent portion 63, adapted to enter a recess 64 in the inner part of the rod 7, as the member 58 is manually turned counterclockwise for about ninety degrees into a position to unlock it from the posts 59 when it is desired to open the casing closure 3. At the normal adjustment of the parts the spring 61 turns the locking member 58 clockwise to assure the engagement of the solid half portions of the member 58 behind its slots 60, within the slots 60 of the fixed posts 59, as shown in Fig. 5, to prevent opening of the casing closure 3, while leaving the rod 7 free to move vertically in the locking member recess 62, as the ejector is operated by the lever 10 and pawl 12.

Fig. 3 shows that the closure 3 cannot be safely swung open upward on its hinge 65, unless the ejector 6 be withdrawn, or nearly withdrawn, from the butter container 4, and Fig. 5 shows that the locking member 58 must be turned about ninety degrees in order to release it from the posts 59, for releasing, or unlocking, the closure 3. Fig. 9 shows that during forward movement of the ejector 6, by the lever 10 and pawl 12, and while the rod recess 64 is below the locking member 58 the latter may be turned counterclockwise for only about forty-five degrees, a movement insufficient to unlock the member 58 from the fixed posts 59, which requires a ninety degree movement as above described. If the container 4 is to be recharged with butter, or if the ice supply is to be replenished, or if interior cleaning be required, the closure 3 must be opened, and to do this the ejector rod 7 is seized by one hand which also holds the upper end of the pawl 12 close to the rod, thereby disengaging the detent 14 from the rod rack 9, and allowing the ejector 6 to be quickly drawn back in the container 4, or from it, until the detent portion 63 of the locking member 58 enters the rod recess 64 as this member is turned counterclockwise by the other hand, and against the tension of the spring 61. This entrance of the detent 63 into the rod recess 64 permits the necessary full one-quarter turn of the locking member 58 to unlock it from the posts 59, and now the closure 3 may be swung open on its hinge 65, carrying the ejector with it, to give full access to the interior of the casing.

While I have described the invention in a more or less specific form I do not limit myself to any of the precise features or methods of arranging the parts described herein, as the application is designed to cover any modifications or departures which may involve the essential characteristics of the improvement, as already set forth, and as defined in the following claims.

I claim as my invention:

1. In a dispensing apparatus, the combination with a container having a discharge opening, an ejector movable therein and means for actuating it, and a cutting member movable transversely of the discharge opening, of a rotary plate carrier arranged beneath the container adapted to sustain a plurality of plates and having a step by step movement to bring successive plates thereon into operative position beneath the container and devices controlled by the ejector actuating means for causing a partial rotation of the plate carrier after each operation of the ejector.

2. In a dispensing apparatus, the combination with a container having an open end of a longitudinally moving ejector, a cutting member movable transversely of said open end, a lever swinging in a plane parallel to the path of movement of the ejector for operating the ejector and devices actuated during the latter part of the operative stroke of said lever for causing movement of the cutting member.

3. In a dispensing apparatus, the combination with a container having an open discharge end, a movable ejector in the container, a cutting member movable transversely of the discharge opening and ejector actuating means including a main lever, of a movable plate carrier arranged beneath the container and adapted to sustain a plurality of plates, and devices actuated during the latter part of the operative stroke of said lever for effecting movement of the plate carrier to bring a following plate upon another portion thereof beneath the discharge opening of the container.

4. In a dispensing apparatus, the combination with a container having a discharge opening, an ejector movable in the container and a cutting member movable transversely of the discharge opening, of ejector actuating means, a movable plate carrier located beneath the container and adapted to sustain a plurality of plates, and devices actuated during the movement of said means for effecting first a movement of the cutting member and subsequently a movement of the plate carrier to bring a following plate upon another portion thereof beneath the discharge opening of the container.

5. In a dispensing machine, the combination with a casing, a closure therefor and a container therein, an ejector in said container, coöperating locking members on the casing and closure, one of which is movable to release the closure, and a rod for operating the ejector normally engaging said movable locking member to prevent its movement.

6. The combination with a casing, a container therein, a cover for the casing and interlocking members on the casing and cover, one of which is movable to unlock the cover, of an ejector in the container and means for operating the ejector also coöperating with the movable member to prevent its movement to unlock the cover.

7. The combination with a casing, a container therein and a cover closing the casing, of interlocking members on the casing and cover, one of which is movable to unlock the cover, an ejector operating in the container and an actuating member therefor extending through the cover and coöperating with said movable member to normally retain the cover in locked position and permit it to be unlocked only when said ejector is in a predetermined position of adjustment.

8. The combination with a casing, a container therein and a cover closing the casing, of interlocking members on the casing and cover, one of which is movable to unlock the cover, an ejector operating in the container, and a rod for actuating it coöperating with the interlocking member on the cover when in one position of adjustment to release said member and permit the cover to be unlocked.

9. In a dispensing machine, the combination with a container having a discharge opening, an ejector movable in the container and means for moving it, of an actuating member controlled by said means, a swinging cutting member movable transversely of the discharge opening, yielding means for holding the cutting member in its normal position and a spring actuated latch carried by the cutting member and lying in the path of said actuating member.

10. In a dispensing machine, the combination with a container having a discharge opening, of an ejector movable in the container, ejector actuating means, an actuator controlled by the ejector actuating means, a cutting member movable transversely of the discharge opening, a plate carrier loosely mounted on a post, a sleeve mounted on said post and engaging the plate carrier to operate it, a spring controlling said sleeve and a link connecting the sleeve and the aforesaid actuator.

11. In a dispensing machine, the combination with a container having a discharge opening, of an ejector movable in the container, ejector actuating means, an actuator controlled by the latter, a cutting member movable transversely of the discharge opening, locking means coöperating with the plate carrier to prevent reverse movement thereof, and a stop member acting to prevent excessive forward movement of the plate carrier.

12. In a dispensing machine, the combination with a container having a discharge opening, of an ejector movable in the container, a cutting member movable transversely of the discharge opening, an actuator, a plate carrier arranged beneath the discharge opening, a post on which the plate carrier is loosely mounted, a sleeve on said post having operative connection with the plate carrier and effecting its movement in one direction, a spring controlling the sleeve, and connections between the sleeve and said actuator.

13. In a dispensing apparatus, the combination with a casing forming two chambers, of a container disposed in one of them and having an outlet, the other chamber being adapted for storing given quantities used as charges for said container, an ejector movable in the container and a cutting member movable transversely of the outlet.

14. In a dispensing apparatus, the combination with a casing, of a container disposed vertically in the casing, an ejector movable therein, a cutting member movable in a horizontal plane transversely of the container and a plate carrier movable horizontally beneath the container a predetermined distance at each operation of the ejector.

15. In a dispensing apparatus, the combination with a vertically disposed container, of an ejector movable therein, a cutting member movable transversely of the container and a plate carrier movable beneath the container, said plate carrier having plate retaining openings permitting a plate to lie at an angle to a horizontal plane.

16. In a dispensing apparatus, the combination with a vertically disposed container having a discharge opening, of an ejector movable therein, a cutting member movable transversely of the container, and a plate carrier beneath the container having plate supporting means for holding a plate at an angle to a horizontal plane.

17. In a machine for serving butter patties, the combination with a container for a given volume of butter comprising a body portion and a neck portion having a restricted opening, of a temperature regulating chamber adapted to contain a refrigerant and surrounding said container and the upper portion only of the neck thereof, said parts being so disposed that said neck is maintained at the same or a slightly warmer temperature than the body of said container by a comparatively small portion of the refrigerant, and means for expressing the butter from the container.

18. The combination with a container having a restricted discharge opening and adapted to contain butter, of an ejector, means for moving it forwardly step-by-step and means for locking it in its advanced position, said means being arranged to permit a slight retrograde movement of the ejector after each step for the purpose of relieving the pressure on the mass of butter.

19. In a dispensing apparatus, the combination with a container, an ejector therein having a piston rod provided with a rack, and an oscillatory lever pivoted at one side of the rack, of a pawl movable on the lever and coöperating with the rack and arranged with its pivot so located relatively to that of the lever that the ejector after being advanced is permitted a retrograde movement and a detent also coöperating with the rack.

20. In a dispensing apparatus, the combination with a container, an ejector therein having a piston rod provided with a rack, and an oscillatory lever pivoted at one side of the rack, of a pawl mounted on the lever and coöperating with the rack and arranged with its pivot so located relatively to that of the lever that upon continued movement of the lever in one direction the ejector is advanced to the limit of its movement and then permitted to retract and a detent also coöperating with the rack to limit the retracting movement of the ejector when said lever is moved in the opposite direction.

21. In a dispensing apparatus, the combination with a casing having an aperture and adapted to contain a cooling medium, of a container removably located in the casing having a restricted neck projecting through and secured in said aperture, the walls of the aperture within the casing being separated from the wall of the container and its neck to provide a space for the circulation around the neck of a comparatively small portion of the cooling medium.

22. In a dispensing apparatus, the combination with a casing having a bottom recess provided with an aperture and adapted to contain a refrigrant, of a container having a body portion located in the casing and recess and having a restricted neck portion secured in the aperture, said recess being larger than the diameter of the container and forming a restricted circulating passage around its neck for a comparatively small portion of the refrigerant.

23. In a dispensing apparatus, the combination with a casing adapted to contain a cooling medium and having an aperture, a container located in the casing having at one end a neck of lesser diameter fitting said aperture, of an insulator surrounding the neck and located beneath the shoulder formed between said neck and the wall of the container for lessening the chilling effect of the cooling medium in the neck of the container.

24. In a dispensing apparatus, the combination with a container having a discharge opening, an ejector therein having a piston rod and a lever oscillating in a plane parallel to that of the rod, of a severing device movable across the discharge opening and a member for actuating the severing device positioned to be engaged by the lever as the latter approaches the limit of its movement in one direction.

25. In a dispensing apparatus, the combination with a container having a discharge opening in its lower end, an ejector and a vertically swinging lever for moving the ejector downwardly in the container, of a cutter movable across the discharge opening and an actuating member therefor arranged to be moved vertically by the lever as it moves in the direction of operation of the ejector.

26. In a dispensing apparatus, the combination with a container having a discharge opening, an ejector and a lever of operating connections between the lever and ejector for advancing the ejector a predetermined distance during a portion of the oscillatory movement of the lever in one direction and permitting its retrograde movement during the remainder of such oscillatory movement of the lever.

27. In a dispensing apparatus, the combination with a container having a discharge opening, an ejector, a lever and a cutter coöperating with said opening, of operating connections between the lever and ejector for advancing the ejector a predetermined distance during a portion of the oscillating movement of the lever in one direction and thereafter permitting the lever to move independently of the ejector and an actuator for the cutter arranged to be engaged by the lever during the independent portion of its movement.

28. In a dispensing apparatus, the combination with a container and an ejector therein having a piston rod, of a lever pivoted to swing in a plane parallel to that of the piston rod and operating connections between the rod and lever acting to advance the former a predetermined distance during a portion of the movement of the lever in one direction, and also allowing the ejector to retract during the remainder of said movement of the lever.

29. In a dispensing apparatus, the combination with a container and an ejector therein having a piston rod, of a lever pivoted to swing in a plane parallel to that of the piston rod and operating connections between the rod and lever acting to advance the former a predetermined distance during a portion of the movement of the lever in one direction, and a detent coöperating with the piston rod and arranged to permit its limited retrograde movement upon the oscillation of the lever in the opposite direction.

30. In a dispensing apparatus, the combination with a container, an ejector therein having a rack, and a detent coöperating therewith to limit its retrograde movement, of an operating member and a pawl on said member coöperating with the rack and arranged when said member is in one position to also coöperate with the detent and disengage it when said pawl is disengaged from the rack.

31. In a dispensing apparatus, the combination with a container, an ejector therein having a rack, and a detent coöperating therewith to limit its retrograde movement, and provided with a projection, of an operating member and a pawl thereon coöperating with the rack and adapted when said member is in one position of adjustment to lie in front of the projection on the detent, and serving to disengage the latter when said pawl is moved out of engagement with the rack.

32. A dispensing apparatus, comprising a container, an ejector therein and means for advancing it step by step and releasing it at the end of each step, and a detent member limiting the retrograde movement of the ejector when released.

33. A dispensing apparatus, comprising a container, an ejector therein having a rack bar, a lever having a pawl coöperating with the rack when the lever is moved downwardly to advance the ejector and a detent coöperating with said rack to arrest its upward movement, said detent being arranged to engage the rack after the ejector has started to move upwardly.

34. In a dispensing apparatus, the combination with a casing having side walls, bottom and a movable cover, a container therein having an end discharging through the bottom, and an ejector in the container having a piston rod, of a lever pivoted on the cover in rear of the rod and coöperating therewith and arranged with its free end projecting beyond the edge of the casing, a cutter movably supported on the bottom of the casing and means for actuating it located in the path of the free end of the lever.

35. In a dispensing apparatus, the combination with a casing having side walls, bottom and a movable cover, a container therein having an end discharging through the bottom and an ejector in the container having a piston rod, of a lever pivoted on the cover in rear of the rod and coöperating therewith and arranged with its free end projecting beyond the edge of the casing, a cutter movably supported on the bottom of the casing and means for actuating it located in the path of the free end of the lever and comprising separable parts, one portion being mounted on the side wall of the casing and the other being mounted on the cover.

36. In a dispensing apparatus, the combination with a casing having side walls, a bottom and a movable cover, a container in the casing having a lower open end discharging through the bottom and an ejector in the container, of a cutting device pivoted on the bottom of the casing, a lever on the cover for operating the ejector and pivoted to move in a vertical plane, means for actuating the cutting member supported on a side wall of the casing and having a part projecting above the surface of the cover and lying in the plane of the lever.

BENNETT D. STRAIGHT.

Witnesses:
J. S. AVERY,
G. WILLIARD RICH.

Copies of this patent may be obtained for five cents each, by addressing the "Commissioner of Patents, Washington, D. C."